(12) United States Patent
Wang

(10) Patent No.: US 8,089,561 B2
(45) Date of Patent: Jan. 3, 2012

(54) GAMMA CORRECTION APPARATUS

(75) Inventor: Shih-Chung Wang, Hsinchu (TW)

(73) Assignee: Mstar Semiconductor, Inc, Hsinchu Hsien (TW)

( * ) Notice: Subject to any disclaimer, the term of this patent is extended or adjusted under 35 U.S.C. 154(b) by 820 days.

(21) Appl. No.: 12/222,220

(22) Filed: Aug. 5, 2008

(65) Prior Publication Data

US 2009/0040389 A1    Feb. 12, 2009

(30) Foreign Application Priority Data

Aug. 9, 2007 (TW) .............................. 96129468 A

(51) Int. Cl.
*H04N 5/202* (2006.01)

(52) U.S. Cl. ...................... 348/674; 348/671; 348/254

(58) Field of Classification Search .................. 348/674, 348/671, 254
See application file for complete search history.

(56) References Cited

U.S. PATENT DOCUMENTS

| 5,289,210 | A | | 2/1994 | Takayanagi | |
|---|---|---|---|---|---|
| 6,061,144 | A | * | 5/2000 | Mamizuka | ..................... 358/1.9 |
| 6,404,512 | B1 | * | 6/2002 | Tone | ............................. 358/3.01 |
| 7,203,109 | B1 | | 4/2007 | Miller et al. | |
| 2003/0151667 | A1 | * | 8/2003 | Nakami et al. | ............. 348/207.1 |
| 2005/0275640 | A1 | * | 12/2005 | Kobayashi et al. | ............ 345/204 |
| 2007/0085911 | A1 | * | 4/2007 | Nakamura | .................. 348/223.1 |
| 2007/0262972 | A1 | * | 11/2007 | Nakata | ........................... 345/204 |

* cited by examiner

*Primary Examiner* — Pankaj Kumar
*Assistant Examiner* — Mulugeta Mengesha
(74) *Attorney, Agent, or Firm* — Rabin & Berdo, P.C.

(57) ABSTRACT

A gamma correction apparatus includes a load controlling unit, a non-volatile memory, a volatile memory, a checking unit and a counter. The non-volatile memory stores gamma data and a checking code. The load controlling unit controls an operation of loading the gamma data from the non-volatile memory into the volatile memory. The checking unit receives the checking code and detects whether the gamma data in the volatile memory have an error according to the checking code. The counter accumulates the number of times that the checking unit has detected the error. When the checking unit detects the error, the load controlling unit re-loads the gamma data from the non-volatile memory into the volatile memory.

8 Claims, 2 Drawing Sheets

GAMMA CORRECTION APPARATUS

This application claims the benefit of Taiwan application Serial No. 96129468, filed Aug. 9, 2007, the subject matter of which is incorporated herein by reference.

BACKGROUND OF THE INVENTION

1. Field of the Invention

The invention relates in general to a gamma correction apparatus, and more particularly to a gamma correction apparatus capable of avoiding an electrostatic discharge (ESD) effect and a memory process defect.

2. Description of the Related Art

In the current age in which the technological development changes with each passing day, the gamma correction has been widely applied to various image display occasions so that the image display effect satisfies the mental percipience of the human's visual feeling. When the gamma correction has to be performed on an original image frame, a corresponding output gray-scale level gray_out is mapped and generated according to a gamma value γ, an input gray-scale level gray_in and a highest gray-scale level gray_max through a predetermined gamma curve, such as $$\text{gray\_out} = \text{gray\_max} \times \left(\frac{\text{gray\_in}}{\text{gray\_max}}\right)^{\gamma}.$$

In the current technology, the gamma correction curve is stored in a look-up table. When a gamma correction unit wants to perform the gamma correction, the look-up table is loaded into a memory so that the gamma correction can be performed. However, the data of the look-up table in the memory tends to be influenced by the external interference, such as the electrostatic discharge (ESD) effect, and thus has errors. Thus, the gamma correction effect is deteriorated, or even errors may occur.

SUMMARY OF THE INVENTION

The invention is directed to a gamma correction apparatus capable of effectively improving the drawbacks that the conventional gamma correction apparatus tends to be influenced by the ESD effect and that the gamma correction result tends to have errors. Thus, the invention substantially can effectively prevent the operation of the gamma correction apparatus from being influenced by the ESD effect and can terminate the operation of the gamma correction apparatus when the gamma correction apparatus has the permanent damage so that the gamma correction correctness can be advantageously enhanced.

According to the present invention, a gamma correction apparatus is provided. The gamma correction apparatus includes a load controlling unit, a non-volatile memory, a volatile memory, a checking unit and a counter. The non-volatile memory stores gamma data and an associated checking code. The load controlling unit is for controlling an operation of loading the gamma data from the non-volatile memory into the volatile memory. The checking unit is for receiving the checking code and detecting whether the gamma data in the volatile memory have an error according to the checking code. The counter is for counting the number of times that the checking unit has detected the error. When the checking unit has detected the error, the load controlling unit re-loads the gamma data from the non-volatile memory into the volatile memory.

The invention will become apparent from the following detailed description of the preferred but non-limiting embodiment. The following description is made with reference to the accompanying drawings.

DETAILED DESCRIPTION OF THE INVENTION

Figure 1:
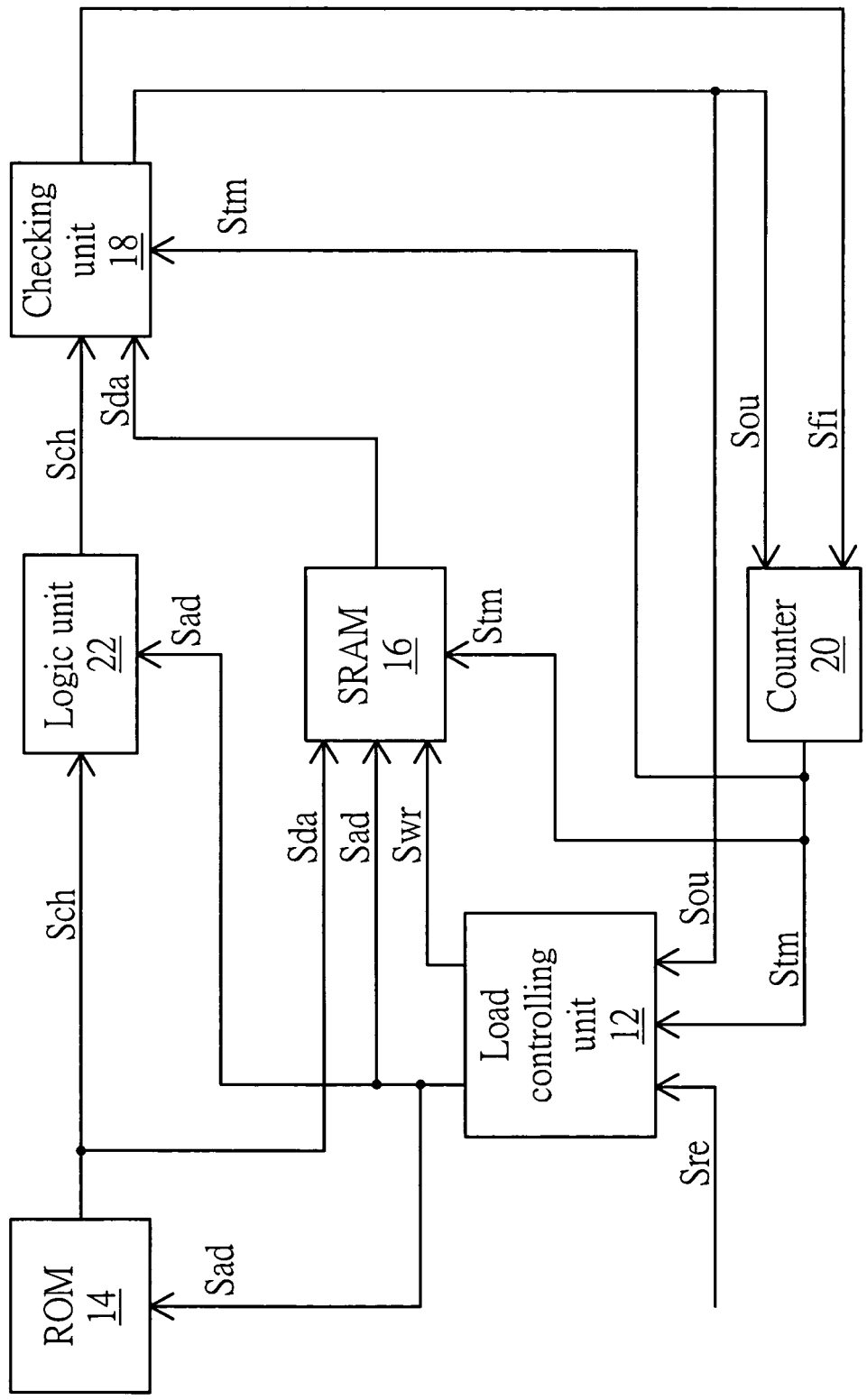
FIG. 1 is a block diagram showing a gamma correction apparatus according to an embodiment of the invention.

FIG. 1 is a block diagram showing a gamma correction apparatus 10 according to an embodiment of the invention. As shown in FIG. 1, the gamma correction apparatus 10 is applied to a display system to perform the gamma correction on input gray-scale levels (not shown) so that the display system has the better display effect. The gamma correction apparatus 10 includes a load controlling unit 12, a ROM 14, a SRAM 16, a checking unit 18 and a counter 20. The load controlling unit 12 provides an address signal Sad and a write signal Swr to the ROM 14 and the SRAM 16, respectively, to control the operation of loading gamma data from the ROM 14 into the SRAM 16. The ROM 14 is an example of this embodiment and can be replaced by other non-volatile memory. Similarly, the SRAM 16 is an example of this embodiment and can be replaced by other volatile memory.

The ROM 14 is for storing gamma data Sda and an associated checking code Sch, and provides the gamma data Sda and the checking code Sch corresponding to an address according to the address signal Sad. The SRAM 16 receives and stores the gamma data Sda according to the write signal Swr, and stores the gamma data Sda into a corresponding address of the SRAM 16 according to the address signal Sad.

For example, the gamma data Sda is substantially for representing a corresponding gamma curve for mapping the input gray-scale level (not shown) to the corresponding gamma data Sda. When the gamma data Sda is completely loaded, the SRAM 16 can map the input gray-scale level to the corresponding gamma data so that the corresponding gamma correction can be performed.

Figure 2:
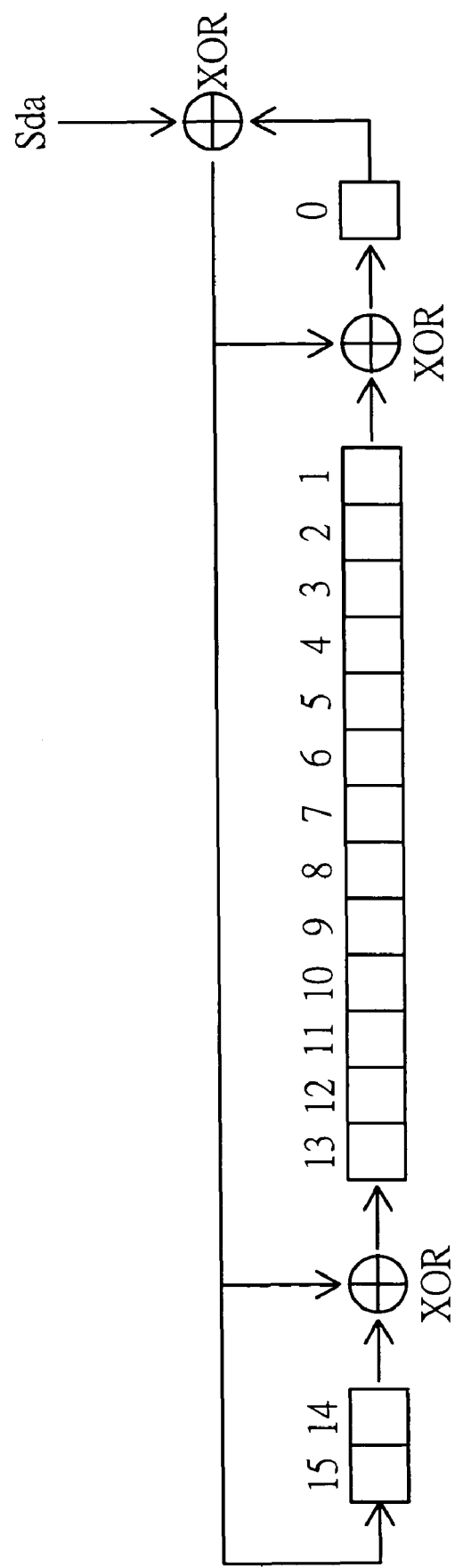
FIG. 2 is a schematic illustration showing a checking unit 18 of FIG. 1.

The checking unit 18 receives the gamma data Sda stored in the SRAM 16 and calculates the gamma data Sda to obtain a calculated value (not shown). The checking unit further receives the checking code Sch and compares the checking code Sch with the calculated value to detect whether the gamma data Sda stored in the SRAM 16 is correct. The checking unit 18 is, for example, a conventional cyclic redundancy check (CRC) checking unit having a schematic illustration shown in FIG. 2. In this embodiment, when the calculated value calculated by the checking unit 18 is equal to the checking code Sch, it represents that the gamma data Sda has no error. If the calculated value is unequal to the checking code Sch, it represents that the gamma data has an error. The load controlling unit 12 re-loads the gamma data from the ROM 14 into the SRAM 16 when the checking unit 18 has detected that the gamma data exist error. The counter 20 counts the number of times that the checking unit 18 has continuously detected the errors or calculates the number of times of repeatedly loading the gamma data. Each time when the checking unit 18 has detected the gamma data of the SRAM 16 as correct, the number counted by the counter is reset or zeroed.

Thus, the gamma correction apparatus 10 of this embodiment can automatically perform the operation of re-loading the gamma data when the gamma data Sda loaded into the SRAM 16 has the error. Consequently, the gamma correction apparatus 10 of this embodiment can effectively prevent the operation of the gamma correction apparatus from being influenced by the external sudden interference, such as the electrostatic discharge (ESD) effect which makes the gamma correction produce the error.

In one embodiment of the invention, the checking unit 18 generates a finishing signal Sfi when finishing the operation of comparing the checking code Sch with the calculated value to determine whether they are the same, and generates an output signal Sou when the checking code Sch and the calculated value are the same. The counter 20 responds with the finishing signal Sfi and the output signal Sou to determine whether the checking code Sch and the calculated value are the same. When the counter 20 receives the finishing signal Sfi and the output signal Sou, it represents that the checking code Sch and the calculated value are the same.

When the counter 20 receives the finishing signal Sfi but does not receive the output signal Sou, it represents that the checking code Sch is unequal to the calculated value. That is, the gamma data Sda in the SRAM 16 is incorrect. At this time, the counter 20 accumulates the number of times of repeatedly loading the gamma data.

When the number of times of repeatedly loading the gamma data exceeds a default value, the counter 20 generates a terminating signal Stm to disable the load controlling unit 12, the SRAM 16 and the checking unit 18. Thus, the gamma correction apparatus 10 is disabled from the gamma correction, wherein the default value is a natural number greater than 1.

When the number of times of repeatedly loading the gamma data exceeds the default value, it represents that the gamma correction apparatus 10 substantially generates the permanent damage (e.g., the SRAM 16 has a process defect or the memory cell of the SRAM 16 is damaged after being used for a long time), and the gamma data Sda continuously have errors. At this time, the gamma correction apparatus 10 of this embodiment terminates the gamma correction thereof according to the terminating signal Stm. Consequently, the gamma correction apparatus 10 of this embodiment may further effectively stop the gamma correction when the hardware thereof has the permanent damage so that the influence on the display effect of the display system can be avoided.

The load controlling unit 12 can determine whether the checking code Sch and the calculated value are the same according to the output signal Sou, and provide the address signal Sad and the write signal Swr to drive the SRAM 16 to load the gamma data Sda in the ROM 14 when they are not the same.

In one embodiment, the load controlling unit 12 includes a logic unit (not shown) for providing the address signal Sad and the write signal Swr to drive the SRAM 16 to load the gamma data Sda in the ROM 14 when an event of a reset signal Sre is detected or when an event of the output signal Sou is not detected. The logic unit of this embodiment is, for example, an NOR gate, which responds with the low levels of the reset signal Sre and the output signal Sou to determine whether their corresponding events as being triggered, and re-load the gamma data from the ROM 14 into the SRAM 16 when any one corresponding event is triggered.

The gamma correction apparatus 10 of this embodiment further includes a logic unit 22 for responding with the address signal Sad to receive and provide the checking code Sch, provided from the ROM 14, to the checking unit 18.

The gamma correction apparatus of this embodiment compares the calculated data of the gamma data with the checking code through the checking unit, and controls the gamma correction apparatus to re-load the gamma data into the SRAM when the compared result represents that they are not the same. Consequently, the gamma correction apparatus of this embodiment can effectively improve the drawbacks that the conventional gamma correction apparatus tends to be influenced by the ESD effect and that the gamma correction result tends to have an error. Thus, it is possible to effectively prevent the operation of the gamma correction apparatus from being influenced by the ESD effect, and the advantages of the gamma correction correctness can be obtained.

In addition, the gamma correction apparatus of this embodiment further detects whether the gamma data in the SRAM has continuous errors for many times through the counter, and determines the gamma correction apparatus as being permanently damaged and disables the gamma correction system when the number of times that the gamma data in the SRAM continuously has errors reaches a predetermined number of times. Consequently, the gamma correction apparatus of the embodiment further has the advantage of effectively preventing the damage of the gamma correction apparatus from influencing the gamma correction correctness thereof.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A gamma correction apparatus, comprising:
   a volatile memory;
   a non-volatile memory for storing gamma data and an associated checking code;
   a load controlling unit for controlling an operation of loading the gamma data from the non-volatile memory into the volatile memory;
   a checking unit for receiving the checking code and detecting whether the gamma data in the volatile memory have an error according to the checking code; and
   a counter for counting a number of times that the checking unit has detected the error,
   wherein when the checking unit has detected the error, the load controlling unit re-loads the gamma data from the non-volatile memory into the volatile memory.

2. The gamma correction apparatus according to claim 1, wherein the checking unit calculates the gamma data in the volatile memory to obtain a calculated value, and then detects whether the gamma data have the error by comparing the checking code with the calculated value.

3. The gamma correction apparatus according to claim 2, wherein the checking unit generates a finishing signal when finishing comparing the checking code with the calculated value, and the checking unit further generates an output signal when a compared result is correct.

4. The gamma correction apparatus according to claim 3, wherein the counter counts the number of times that the checking unit has detected the error according to the finishing signal and the output signal.

5. The gamma correction apparatus according to claim 1, wherein when the number of times that the checking unit has detected the error is greater than a default value, the gamma correction apparatus disables the load controlling unit, the volatile memory and the checking unit.

6. The gamma correction apparatus according to claim 1, wherein whenever the checking unit detects the gamma data in the volatile memory as correct, the checking unit resets the number counted by the counter.

7. The gamma correction apparatus according to claim 1, wherein the load controlling unit loads the gamma data from the non-volatile memory into the volatile memory according to an address signal and a write signal.

8. The gamma correction apparatus according to claim 7, further comprising:

a logic unit for providing the checking code of the non-volatile memory to the checking unit according to the address signal.

* * * * *